(12) United States Patent
Ding et al.

(10) Patent No.: US 7,773,961 B2
(45) Date of Patent: Aug. 10, 2010

(54) APPARATUS AND METHOD FOR CHANNEL ESTIMATION WITHOUT SIGNALING OVERHEAD

(75) Inventors: Yinong Ding, Plano, TX (US); Cornelius van Rensburg, Dallas, TX (US); Farooq Khan, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1181 days.

(21) Appl. No.: 11/297,878

(22) Filed: Dec. 9, 2005

(65) Prior Publication Data

US 2007/0135166 A1    Jun. 14, 2007

(51) Int. Cl.
*H01Q 11/12*    (2006.01)

(52) U.S. Cl. .................................. 455/127.2; 455/561

(58) Field of Classification Search ................. 455/101, 455/522, 69, 561, 127.2, 127.1, 123, 115.3, 455/115.2, 115.1; 370/203, 320, 335, 487, 370/208
See application file for complete search history.

(56) References Cited

U.S. PATENT DOCUMENTS

| 7,337,386 | B2 * | 2/2008 | Chang et al. ................. 714/784 |
| 2006/0034163 | A1 * | 2/2006 | Gore et al. ................... 370/208 |
| 2007/0041311 | A1 * | 2/2007 | Baum et al. .................. 370/208 |

\* cited by examiner

*Primary Examiner*—Tu X Nguyen

(57) ABSTRACT

A base station is disclosed for communicating with a subscriber station in a wireless network without requiring training signaling overhead. The base station is capable of combining a pilot signal with a data symbol and transmitting the combined pilot signal and data symbol to the subscriber station. A power level of the pilot signal is below a power level of the data symbol. The base station may be a single-input, single-output (SISO) antenna system or a multiple-input, multiple-output (MIMO) antenna system.

20 Claims, 6 Drawing Sheets

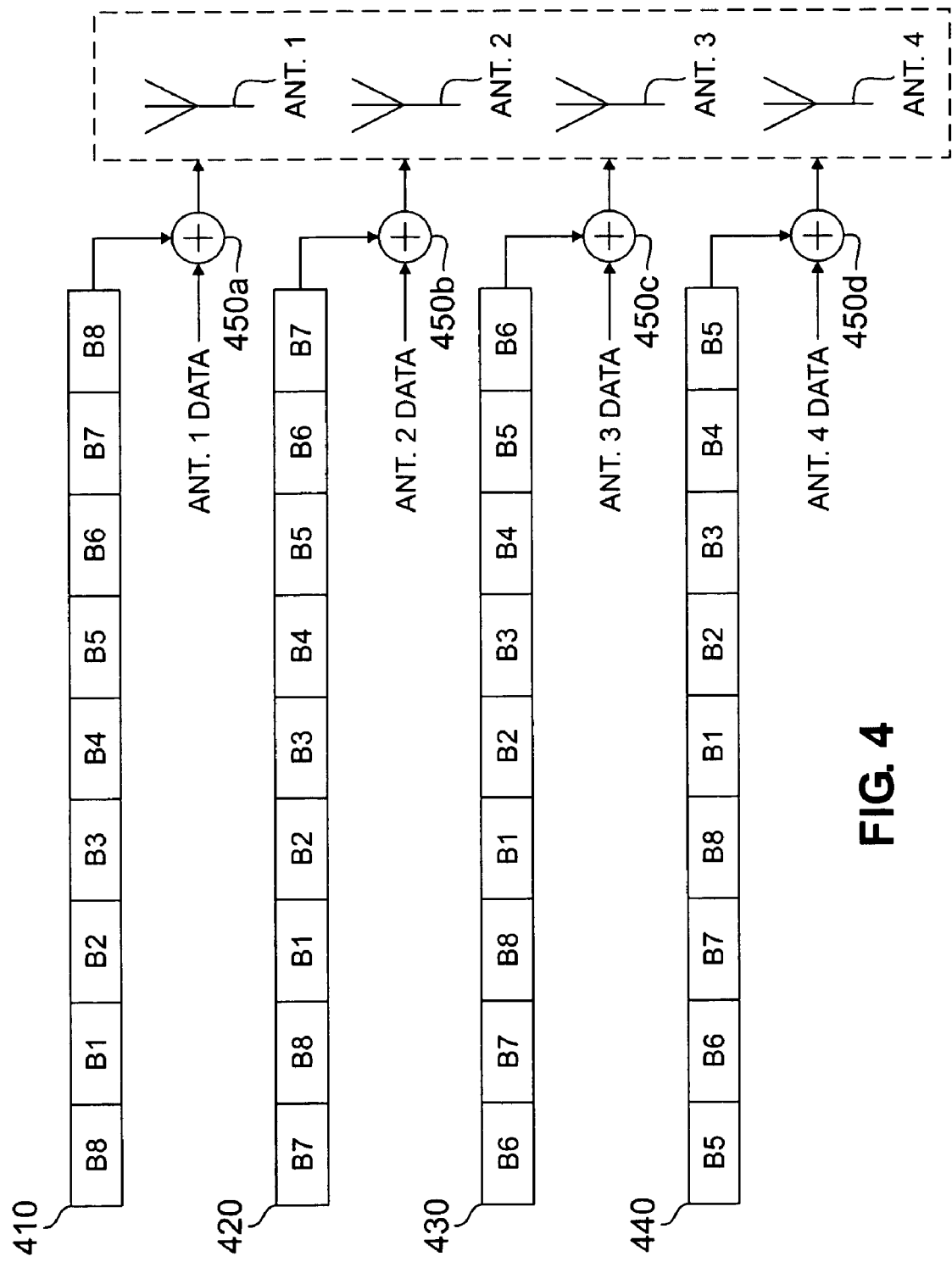

APPARATUS AND METHOD FOR CHANNEL ESTIMATION WITHOUT SIGNALING OVERHEAD

CROSS-REFERENCE TO RELATED APPLICATION(S)

The present application is related to U.S. patent application Ser. No. 11/297,879, entitled "Apparatus And Method For Channel Estimation Using Training Signals With Reduced Signal Overhead," filed on Dec. 9, 2005. Patent application Ser. No. 11/297,879 is assigned to the assignee of the present application. The subject matter disclosed in patent application Ser. No. 11/297,879 is hereby incorporated by reference into the present disclosure as if fully set forth herein.

TECHNICAL FIELD OF THE INVENTION

The present application relates generally to wireless communications and, more specifically, to a channel estimation technique that embeds training signals in data signals to eliminate signaling overhead.

BACKGROUND OF THE INVENTION

Pilot signals (or training signals) are used in a wide variety of wireless transmission systems. Typically, a pilot signal is a known signal waveform that a receiving device expects to see at a predetermined position (usually the start) in a time slot or time frame of the downlink (i.e., the channel from the transmitter to the receiver). The receiving device uses the pilot signal to estimate the downlink channel impulse response and to synchronize accurately with the time slots of the downlink. This greatly improves receiver performance.

However, while a pilot (or training) signal improves the performance of the receiver, it adds additional signaling overhead that reduces the amount of bandwidth available to carry user traffic. This is true in single-input, single-output (SISO) wireless networks as well as in multiple-input, multiple-output (MIMO) wireless networks. In a SISO system, a pilot signal typically precedes user data symbols. The time slot or time slots used for the pilot signal symbols cannot be used to transmit user data symbols.

An increasing number of wireless networks are implemented as multiple-input, multiple-output (MIMO) systems that use multiple antennas to communicate with subscriber stations (also called mobile stations, mobile terminals, and the like). For example, MIMO antenna systems are used in code division multiple access (CDMA) networks, time division multiplexing (TDM) networks, time division multiple access (TDMA) networks, orthogonal frequency division multiplexing (OFDM) networks, orthogonal frequency division multiple access (OFDMA) networks, and others. In order to maximize throughput, MIMO networks use a variety of channel estimation techniques to measure the transmission channel between a base stations of the wireless network and a mobile device. The channel estimation technique used depends on the wireless network type (i.e., CDMA, TDM/TDMA, OFDM/OFDMA).

For example, in an OFDM/OFDMA wireless network, a MIMO base station may transmit a first pilot signal from a first antenna and a second pilot signal from a second antenna. A subscriber station receives both pilot signals and uses each pilot signal to perform channel estimation for each antenna. The symbols of the pilot signals are transmitted on orthogonal subcarriers to prevent the pilot signals from interfering with each other. No data symbols are transmitted on the subcarriers of the pilot signals. If more than two antennas are used, each antenna transmits a separate pilot signal on a set of dedicated subcarrier that is orthogonal to the other pilot signal subcarriers. The drawback to this method is that a large amount of signaling overhead is used for channel estimation. This wastes bandwidth and reduces system capacity.

A MIMO base station may also transmit separate pilot signals from different antennas using time multiplexing to separate the pilot signals. For example, during a first transmit time instant, the base station may transmit a first pilot signal from a first antenna. Then, during a second transmit time instant, the base station may transmit a second pilot signal from a second antenna. If more than two antennas are used, each antenna transmits a separate pilot signal during a separate transmit time instant. The drawback to this method is that more time slots are needed for pilot signals, thereby reducing the number of time slots available for transmitting user data. As before, this reduces system capacity. It should be noted that the above-mentioned frequency multiplexing and time multiplexing of transmitting pilot signals can be used simultaneously as long as the pilot signals transmitted from different antennas do not interfere with each other (i.e. are made orthogonal both in frequency and in time).

In some CDMA systems, multiple pilot signals are transmitted simultaneously from multiple antennas. The pilots from all antennas are transmitted with preambles that use different pseudo-random noise (PN) codes. This reduces the number of time slots required for pilot signals. However, the drawback to this method is that the receiver circuitry in the mobile device must use complicated interference cancellation techniques to recover the MIMO pilot signals. This method reduces pilot signaling overhead at the cost of a more complicated pilot recovery scheme. This method also decreases the reliability of the channel estimates.

Therefore, there is a need in the art for an improved apparatus and method for performing channel estimation in a multiple-input, multiple-output (MIMO) wireless network or in a single-input, single-output (SISO) wireless network.

SUMMARY OF THE INVENTION

In one embodiment, a base station is disclosed for communicating with a subscriber station in a wireless network without requiring training signal overhead. The base station is capable of combining a pilot signal with a data symbol and transmitting the combined pilot signal and data symbol to the subscriber station. A power level of the pilot signal is below a power level of the data symbol. The base station may be a single-input, single-output (SISO) antenna system or a multiple-input, multiple-output (MIMO) antenna system.

In another embodiment, a method is disclosed for transmitting from a base station of a wireless network to a subscriber station without requiring training signal overhead. The method comprises the steps of generating a pilot signal; combining the pilot signal with a data symbol; and transmitting the combined pilot signal and data symbol to the subscriber station. Advantageously, the base station may comprise an antenna array comprising M antennas capable of transmitting data to a plurality of subscriber stations. In such a case, the steps of generating and combining further comprise the sub-steps of: generating a first pilot signal preamble by adding a first cyclic prefix to a first pilot signal sequence; combining the first pilot signal preamble with a first data symbol; generating a second pilot signal preamble by adding a second cyclic prefix to a second pilot signal sequence, wherein the second pilot signal sequence is a circularly shifted copy of the first pilot signal sequence; and combining the second pilot signal preamble with a second data symbol. The step of transmitting further comprises the sub-steps of: transmitting the combined first pilot signal preamble and first data symbol from a first one of the M antennas; and transmitting the combined second pilot signal preamble and second data symbol from a second one of the M antennas simultaneously with the step of transmitting the combined first pilot signal preamble and first data symbol from the first antenna.

In another embodiment, there is disclosed a subscriber station capable of communicating with a base station of a wireless network. The subscriber station is capable of receiving an incoming signal transmitted by the base station, wherein the incoming signal comprises a data symbol combined with a pilot signal. The subscriber station comprises: detection circuitry for detecting the pilot signal; and cancellation circuitry for canceling the detected pilot signal from the incoming signal to thereby recover the data symbol. The subscriber station further comprises amplification circuitry for adjusting a signal level of the detected pilot signal prior to canceling the detected pilot signal from the incoming signal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates four exemplary preambles transmitted by a base station using four antennas according to an exemplary embodiment;

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

The disclosed apparatus and method for estimating wireless communication channels use pilot (or training) signals that reduce or eliminated signaling overhead and require only a simple channel response estimator in the receiver of the mobile device (i.e., subscriber station, mobile station, mobile terminal, etc.). The disclosed channel estimation technique embeds the pilot signal below the signal of the information data to eliminate the signaling overhead. The pilot signal and the data signal are combined and transmitted simultaneously. In the description that follows, the channel estimation apparatus is embodied in an orthogonal frequency division multiple access (OFDMA) wireless network (e.g., IEEE-802.16) using either a multiple-input, multiple-output (MIMO) antenna system or a single-input, single-output antenna system. However, this is by way of illustration only and should not be construed to limit the scope of the disclosure and the claims herein. Those skilled in the art will understand that the disclosed apparatus and method may be easily adapted for use in other types of wireless networks, including for example, CDMA wireless networks, GSM networks, IEEE-802.20 wireless networks, and others.

Figure 1:
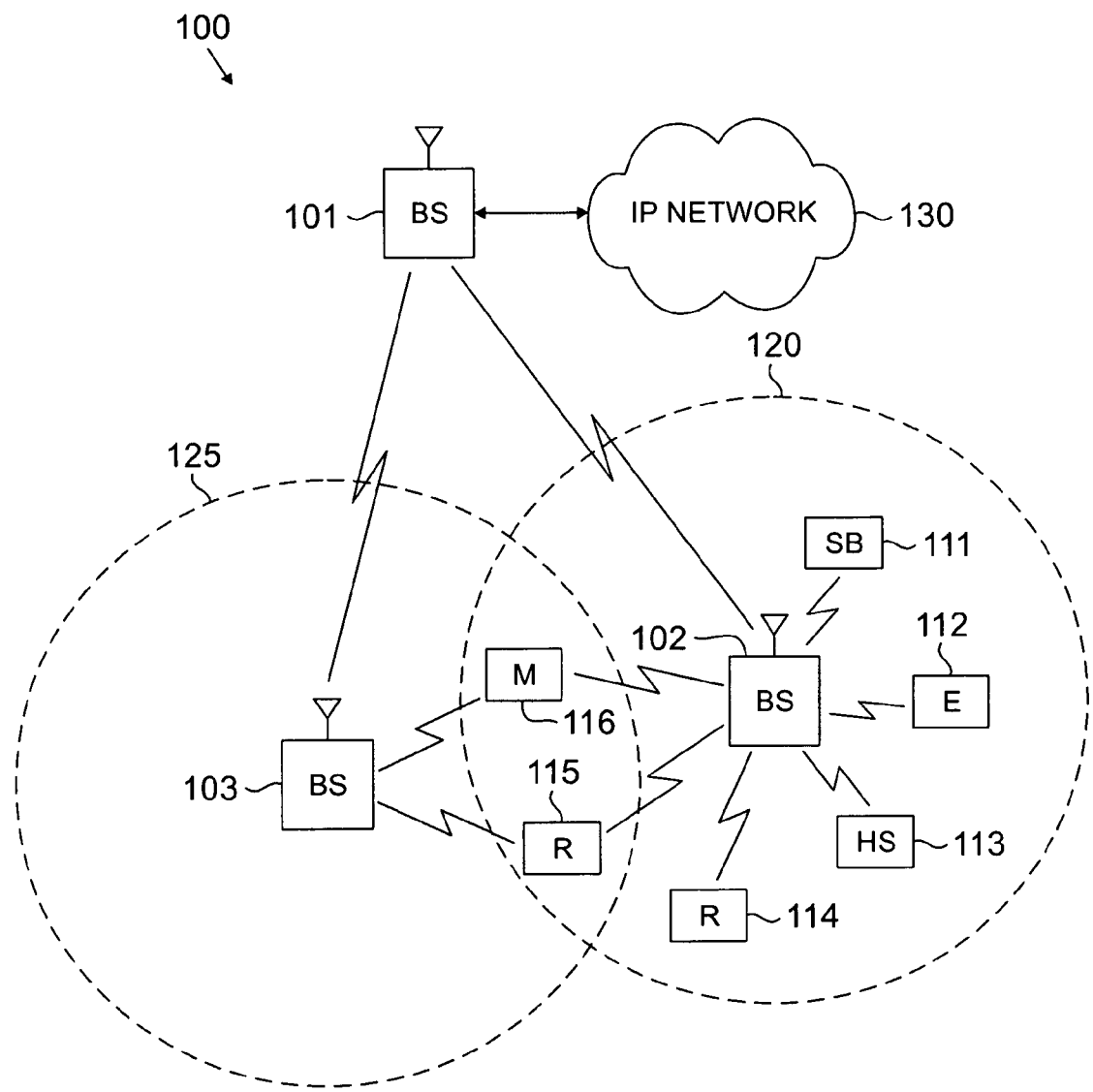
FIG. 1 illustrates a wireless network that implements channel estimation according to the principles of the disclosure.

FIG. 1 illustrates exemplary wireless network 100, which implements channel estimation according to the principles of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. In an exemplary embodiment, SS 111 may be located in a small business (SB), SS 112 may be located in an enterprise (E), SS 113 may be located in a WiFi hotspot (HS), SS 114 may be located in a first residence (R), SS 115 may be located in a second residence (R), and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in soft handoff, as known to those of skill in the art.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight with base station 102 and base station 103. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, cafe, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from about 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. The servers, Internet gateway, and public switched telephone network gateway are not shown in FIG. 1. In another embodiment, the connection to network 130 may be provided by different network nodes and equipment.

Figure 2:
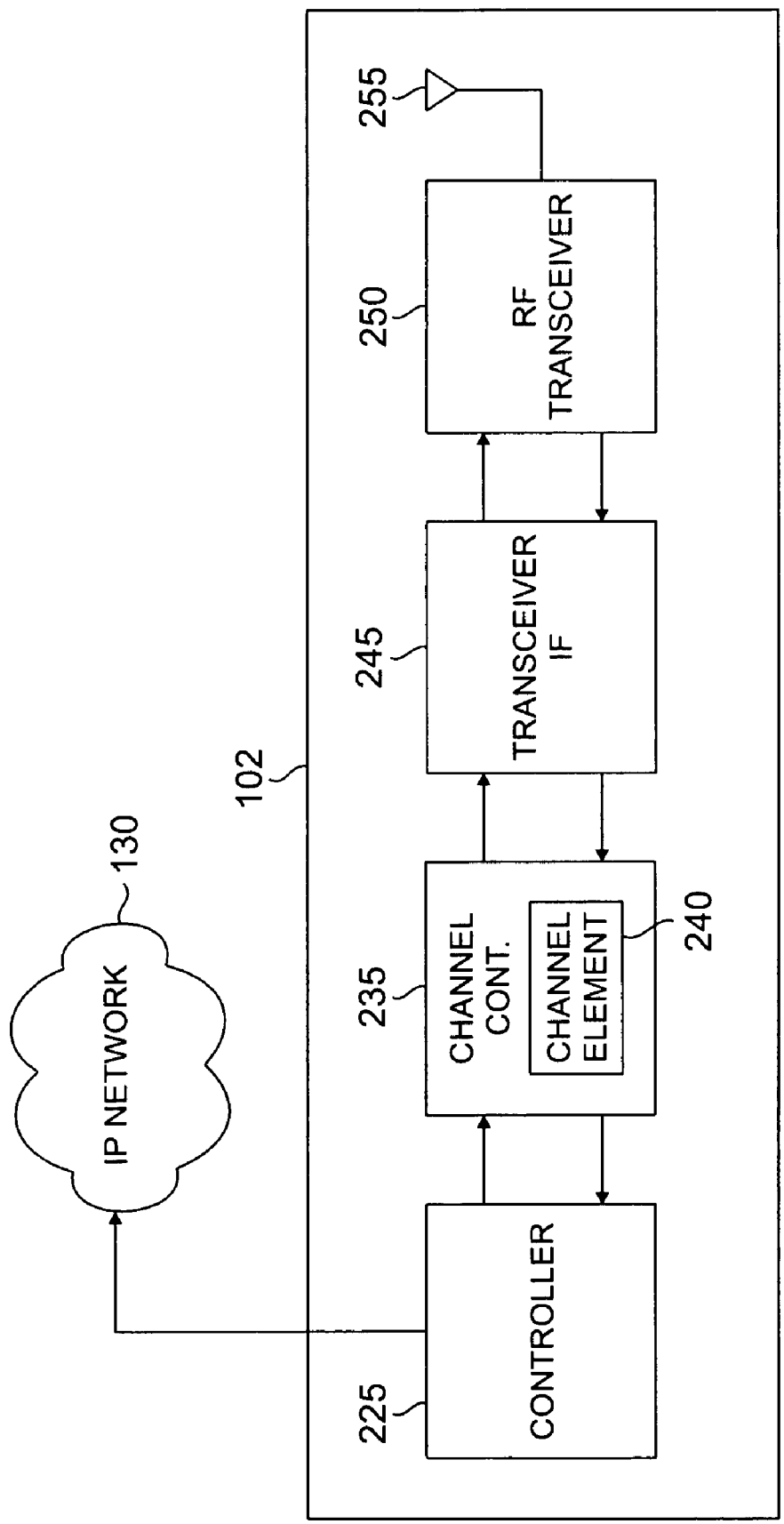
FIG. 2 illustrates a base station that implements channel estimation according to the principles of the disclosure.

FIG. 2 illustrates in greater detail exemplary base station 102, which implements channel estimation according to one embodiment of the present disclosure. Base station 102 is illustrated by way of example only. However, it will be understood that the components illustrated and described with respect to base station 102 are also part of base stations 101 and 103. In one embodiment, base station 102 comprises controller 225, channel controller 235, transceiver interface (IF) 245, radio frequency (RF) transceiver unit 250, and antenna array 255. According to the principles of the present disclosure, antenna array 255 is a multiple-input, multiple output (MIMO) antenna system.

Controller 225 comprises processing circuitry and memory capable of executing an operating program that controls the overall operation of base station 102. In an embodiment, the controller 225 may be operable to communicate with the network 130. Under normal conditions, controller 225 directs the operation of channel controller 235, which comprises a number of channel elements, such as exemplary channel element 240, each of which performs bidirectional communication in the forward channel and the reverse channel. A forward channel (or downlink) refers to outbound signals from base station 102 to subscriber stations 111-116. A reverse channel (or uplink) refers to inbound signals from subscriber stations 111-116 to base station 102. Channel element 240 also preferably performs all baseband processing, including processing any digitized received signal to extract the information or data bits conveyed in the received signal, typically including demodulation, decoding, and error correction operations, as known to those of skill in the art. Transceiver IF 245 transfers bidirectional channel signals between channel controller 235 and RF transceiver unit 250.

Antenna array 255 transmits forward channel signals received from RF transceiver unit 250 to subscriber stations 111-116 in the coverage area of base station 102. Antenna array 255 is also operable to send to RF transceiver unit 250 reverse channel signals received from subscriber stations 111-116 in the coverage area of the base station 102. According to one embodiment of the present disclosure, antenna array 255 comprises a multi-sector antenna, such as a three-sector antenna in which each antenna sector is responsible for transmitting and receiving in a coverage area corresponding to an arc of approximately 120 degrees. Additionally, RF transceiver unit 250 may comprise an antenna selection unit to select among different antennas in antenna array 255 during both transmit and receive operations.

In one embodiment, antenna array 255 may be a multiple-input, multiple-output (MIMO) antenna system that uses multiple antennas in each sector to transmit pilot signals and user data to subscriber stations 111-116. In such an embodiment, each antenna transmits its own pilot signal. Subscriber stations 111-116 use the pilot signals to estimate the channel response for each antenna in antenna array 255 using well-known channel estimation techniques. In another embodiment, antenna array 255 may be a single-input, single-output (SISO) antenna system that uses one antenna in each sector to transmit pilot signals and user data to subscriber stations 111-116.

Figure 3A:
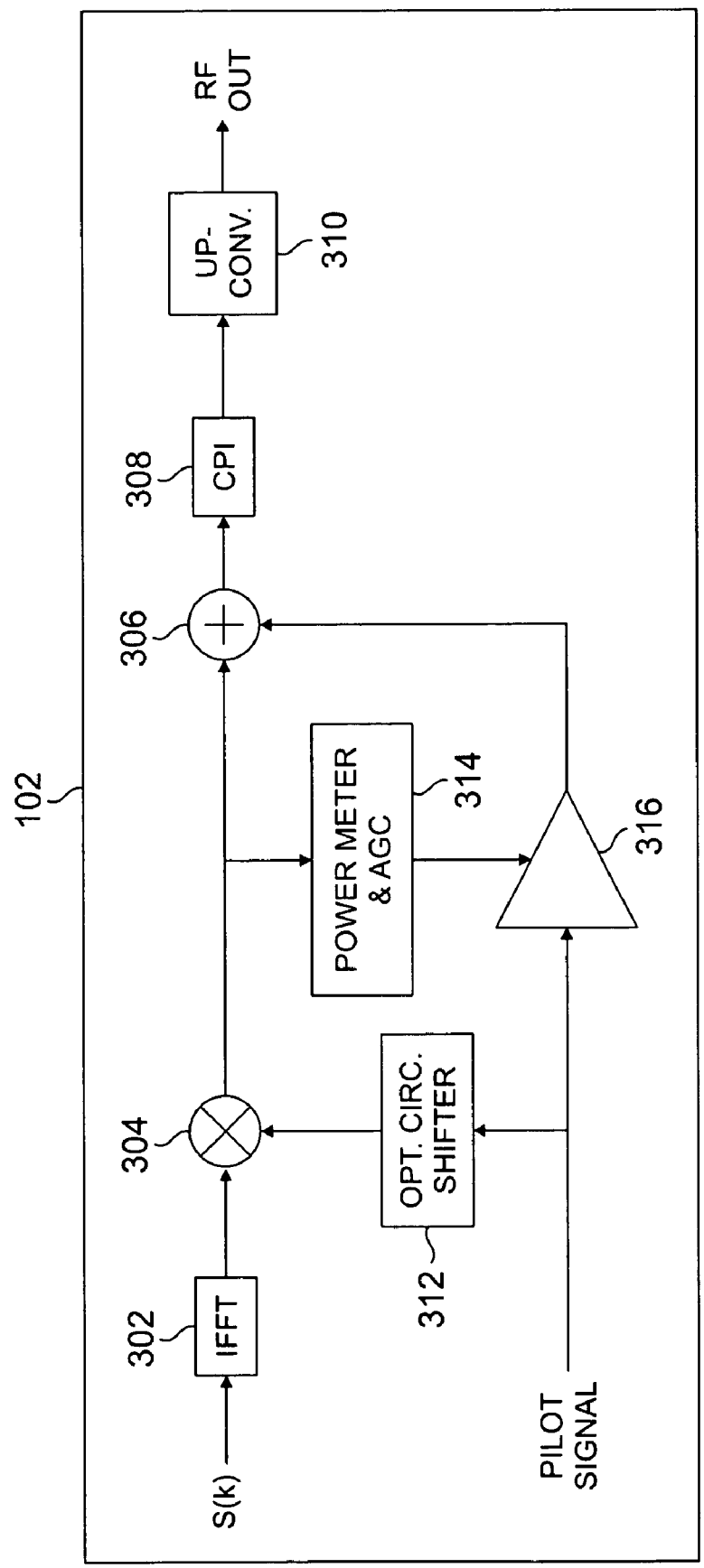
FIG. 3A illustrates selected portions of the transmitter circuitry in a base station according to an exemplary embodiment of the present disclosure.

FIG. 3A illustrates selected portions of the transmitter circuitry in base station 102 according to an exemplary embodiment of the present disclosure. The transmitter circuitry of base station 102 embeds a pilot (or training) signal below the signal of the information data in order to eliminate signaling overhead. The configuration of base station 102 in FIG. 3A corresponds to a single-input, single-output (SISO) antenna system. Base station 102 comprises Inverse Fast Fourier Transform block 302, modulator 304, combiner 306, cyclic prefix insertion (CPI) block 308, up-converter 310, optional circular shifter 312, power meter and automatic gain control (AGC) block 314, and amplifier 316.

IFFT block 302 receives an incoming stream of data symbols, S(k), and modulates a plurality of orthogonal subcarriers in the frequency domain using the S(k) symbols. Optionally, modulator 304 may then modulate the frequency domain outputs of IFFT block 302 using a circularly-shifted version of a pseudo-random noise (PN) pilot (or training) signal in order to further randomize the information data.

Combiner 306 then combines the outputs of IFFT block 302 (or modulator 304) and the PN pilot signal from amplifier 316 to produce a time-domain output signal. Cyclic prefix insertion (CPI) block 308 then adds a cyclic prefix to the time-domain output signal from combiner 306. As is well known, a cyclic prefix is created by copying the last L samples of an N-sample block and appending the last L samples to the start of the N-sample block, so that the first and last L samples of the (N+L)-sample block are the same. Up-converter block 310 then up-converts the output of CPI block 308 to produce an RF output signal that is sent to the SISO antenna system.

Figures 5, 6:
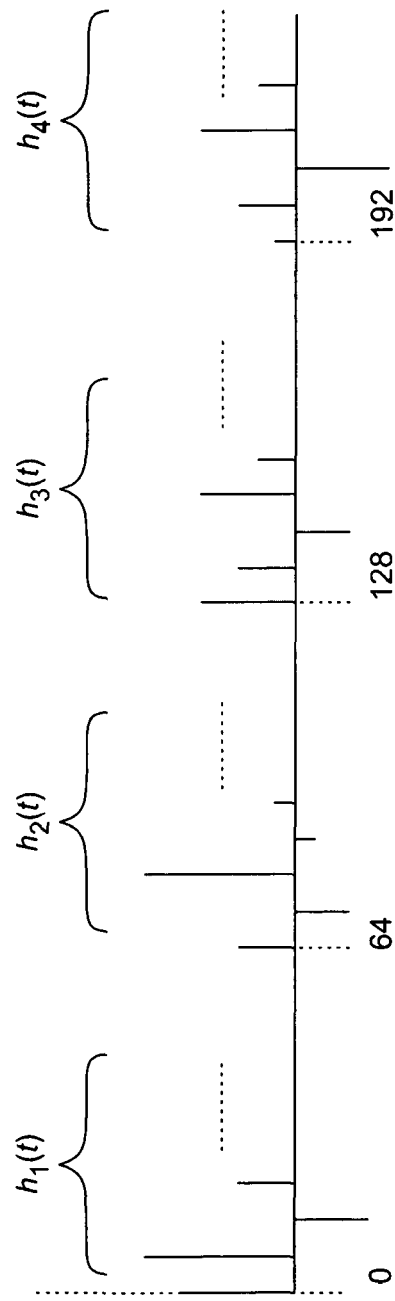
FIG. 5 illustrates an antenna output signal in which data symbols and a pilot signal are combined.
FIG. 6 illustrates the estimation of the channel responses $h_1(t)$, $h_2(t)$, $h_3(t)$, and $h_4(t)$ in the receiving subscriber station according to one embodiment.

According to the principles of the disclosure, the amplitude of the embedded pilot signal is smaller than the amplitude of the transmitted data symbols. The level of the pilot signal is typically well below the level of the information data by a factor denoted as the signal-to-training ratio (STR). FIG. 5 illustrates eight exemplary times slots of antenna output signal 500, in which data symbols and a pilot signal are combined according to the principles of the present disclosure. In FIG. 5, the pilot signal, p(t), is embedded across eight OFDM data symbols. In alternate embodiments, the pilot signal, p(t), may be embedded across more than eight data symbols or less than eight data symbols.

As FIG. 5 illustrates, the power (i.e., magnitude) of the pilot signal, p(t), is much less than the power of the data symbols. For a practical embodiment, an STR value of 12 dB may be used. To accomplish this, power meter and AGC block 314 measures the power (in the frequency domain) of the outputs of IFFT block 302 (or modulator 304) and generates gain control signals that adjust the gain of amplifier 316. In this manner, amplifier 316 may attenuate or amplify the PN pilot signal prior to the PN pilot signal being applied to combiner 306.

Figure 3B:
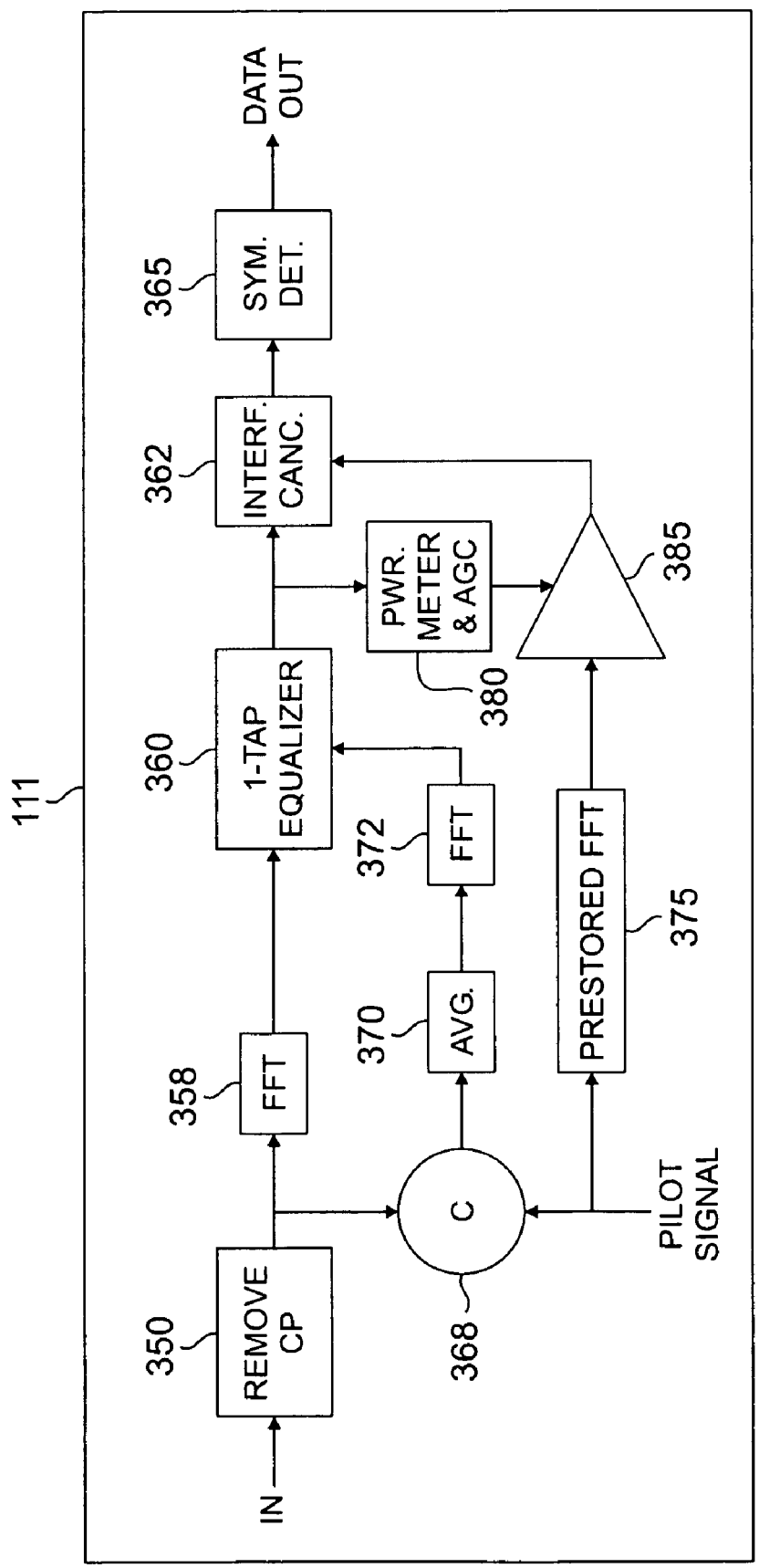
FIG. 3B illustrates selected portions of the receiver circuitry in a subscriber station according to an exemplary embodiment.

FIG. 3B illustrates selected portions of the receiver circuitry in subscriber station 111 according to an exemplary embodiment. Subscriber station 111 comprises remove cycle prefix (CP) block 350, Fast Fourier Transform (FFT) block 358, one-tap equalizer 360, interference canceller 362, symbol detector 365, circular cross-correlator 368, averaging block 370, Fast Fourier Transform (FFT) block 372, prestored Fast Fourier Transform (FFT) block 375, power meter and automatic gain control (AGC) block 380, and amplifier 385.

Remove CP block 350 receives a stream of input data samples from the RF down-conversion circuitry (not shown) in subscriber station 111 and removes the cyclic prefix that was added in base station 102, thereby recovering the combined data symbols and pilot signal samples. The output of remove CP block 350 is applied to the inputs of FFT block 358 and circular cross-correlator 368. FFT block 358 converts the combined data symbols and pilot signal samples from the time domain to a plurality of subcarrier signals in the frequency domain. One-tap equalizer 360 performs equalization according to the detected channel frequency response to produce an equalized output. Interference canceller 362 then removes the PN pilot signal embedded in the equalized output of one-tap equalizer 360. Finally, symbol detector 365 detects the original data symbols, S(k), from the symbol data samples received from interference canceller 362.

As noted above, in order to recover the original data symbols effectively, S(k), the pilot signal must be detected and removed. Otherwire, the signal-to-noise ratio of the received signal will always be smaller than the signal-to-training ratio (STR). For the single-input, single-output (SISO) antenna system described in FIG. 3A above, the received signal, r(t), in subscriber station 111 may be represented as:

$$r(t) = \{k \cdot p(t)\} \Theta h(t) + s(t) \Theta h(t) + n(t) \quad \text{[Eqn. 1]}$$

In Equation 1, the value p(t) is the PN pilot signal, the value h(t) is the channel impulse response, the value s(t) is the information data waveform (i.e., the OFDM waveform), and the value n(t) is the white Gaussian noise. The sign $\Theta$ represents the N-point circular convolution operation. The value k is the attenuating coefficient, such that the level of the PN pilot signal is (−STR) dB below the level of the data symbol signal.

The estimate of the channel impulse response may be performed by a circular cross-correlation between the received signal, r(t), and the PN pilot signal, p(t). In FIG. 3B, this operation is perform by circular cross-correlator 368, which receives as its inputs the output of remove CP block 350 and the same PN pilot signal used in base station 102. It is noted that that the information data term, s(t)$\Theta$h(t), is generally not orthogonal to the PN pilot signal. As a result, the processing gain may be smaller than the length of the PN pilot signal. Therefore, in order to reliably estimate the channel impulse response, averaging block 370 calculates an average of the channel impulse response using the PN pilot signal over multiple OFDM data symbols. FFT block 372 converts the time-domain average of the channel impulse response to the frequency domain to generate filter coefficients that control one-tap equalizer 360.

Due to the embedding of the PN pilot signal in the data symbols, the maximum signal-to-noise ratio (SNR) of the received signal will not be able to exceed the signal-to-training ratio (STR), unless the embedded PN pilot signal is removed or cancelled from the data symbols. Therefore, in cases where the receiver SNR is limited by the STR, an interference cancellation procedure should follow after the channel impulse response is properly identified. The interference cancellation may be done in the time domain or the frequency domain. In FIG. 3B, cancellation is performed in the frequency domain.

Prestored FFT block 375 receives the PN pilot signal and converts the PN pilot signal to a frequency domain signal. Since the PN pilot signal is known and does not change, prestored values may be used in prestored FFT block 375. Power meter and AGC block 380 determines the output power of one-tap equalizer 360 and generates gain control signals that control the gain of amplifier 385. Amplifier 385 attenuates or amplifies the frequency-domain output signal from prestored FFT block 375, depending on the gain control signals received from power meter and AGC block 380.

Interference canceller 362 receives the gain-adjusted, frequency-domain version of the PN pilot signal on one input and receives the equalized output of one-tap equalizer 360. Interference canceller 362 then removes the PN pilot signal embedded in the equalized output of one-tap equalizer 360.

The data symbol samples, minus the PN pilot signal, are then passed on to symbol detector 365.

According to one embodiment of the disclosure, the pilot signal may also be embedded in data symbols transmitted from multiple antennas in a MIMO system. U.S. patent application Ser. No. 11/297,879, incorporated by reference above, further discloses a base station that simultaneously transmits multiple circularly-shifted copies of a pilot signal from multiple antennas in a MIMO wireless network. The teachings of the present disclosure may advantageously be combined with the teachings of U.S. patent application Ser. No. 11/297,879 so that multiple circularly-shifted copies of a pilot signal are embedded in data symbols and transmitted simultaneously from multiple antennas in a MIMO wireless network.

FIG. 4 illustrates four exemplary pilot signal preambles transmitted by base station 102 using four antennas according to an exemplary MIMO embodiment. The antennas in antenna array 255 are labeled Antenna 1, Antenna 2; Antenna 3, and Antenna 4 in this example. Combiner 450a combines (or embeds) preamble 410 with Antenna 1 Data and sends the combined data symbols and embedded pilot signal to Antenna 1. Combiner 450b combines (or embeds) preamble 420 with Antenna 2 Data and sends the combined data symbols and embedded pilot signal to Antenna 2. Combiner 450c combines (or embeds) preamble 430 with Antenna 3 Data and sends the combined data symbols and embedded pilot signal to Antenna 3. Finally, Combiner 450d combines (or embeds) preamble 440 with Antenna 4 Data and sends the combined data symbols and embedded pilot signal to Antenna 4.

In the exemplary embodiment, each pilot signal preamble is generated from an original pilot signal sequence that is a pseudo-random noise (PN) code that is 512 samples in length. The choice of 512 samples is by way of example only. In other embodiments, the PN code of the pilot signal may contain more than 512 samples or less than 512 samples.

The 512-sample PN code is logically divided into eight (8) blocks, where each block contains 64 samples. The blocks are sequentially labeled [B1 B2 B3 B4 B5 B6 B7 B8]. As is well known, a cyclic prefix for a block of N data samples is created by copying the last L samples of the block of N data samples and appending them to the front of the block of N data samples. This increases the length of the block to N+L data samples, where the first L samples and the last L samples of the block of N+L data samples are the same. Ideally, the L samples are at least as long as the channel impulse response length.

A CPI block (not shown) in MIMO base station 102 generates preamble 410 by copying the last L=64 samples (i.e., block B8) of the original pilot signal sequence, namely the 512-sample PN code [B1 B2 B3 B4 B5 B6 B7 B8]. The CPI block then appends block B8 to the start of the original pilot signal sequence to form preamble 410. Thus, the blocks of preamble 410 are transmitted (embedded in one or more data symbols) in the following order: [B8 B1 B2 B3 B4 B5 B6 B7 B8].

The CPI block then generates preamble 420 in parallel with preamble 410. The CPI block generates preamble 420 by circularly shifting the 512-sample PN code [B1 B2 B3 B4 B5 B6 B7 B8] by 64 samples to the right to generate a second pilot signal sequence, namely a new 512-sample PN code: [B8 B1 B2 B3 B4 B5 B6 B7]. Next, the CPI block copies the last 64 samples of the new 512-sample PN code, namely the 64 samples in block B7, and appends block B7 to the start of the second pilot signal sequence. Thus, the blocks of preamble 420 are transmitted (embedded in one or more data symbols) in the following order: [B7 B8 B1 B2 B3 B4 B5 B6 B7].

The CPI block generates preamble 430 in parallel with preambles 410 and 420. The CPI block generates preamble 430 by circularly shifting a second time the second pilot signal sequence, namely the 512-sample PN code [B8 B1 B2 B3 B4 B5 B6 B7], by an additional 64 samples to the right to generate a third pilot signal sequence, namely the new 512-sample PN code: [B7 B8 B1 B2 B3 B4 B5 B6]. Next, the CPI block copies the last 64 samples of the new 512-sample PN code, namely the 64 samples in block B6, and appends block B6 to the start of the third pilot signal sequence. Thus, the blocks of preamble 430 are transmitted (embedded in one or more data symbols) in the following order: [B6 B7 B8 B1 B2 B3 B4 B5 B6].

The CPI block generates preamble 440 in parallel with preambles 410, 420 and 430. The CPI block generates preamble 440 by circularly shifting a third time the second pilot signal sequence, namely the 512-sample PN code [B7 B8 B1 B2 B3 B4 B5 B6], by an additional 64 samples to the right to generate a fourth pilot signal sequence, namely the new 512-sample PN code: [B6 B7 B8 B1 B2 B3 B4 B5]. Next, the CPI block copies the last 64 samples of the new 512 sample PN code, namely the 64 samples in block B5, and appends block B5 to the start of the fourth pilot signal sequence. Thus, the blocks of preamble 440 are transmitted (embedded in one or more data symbols) in the following order: [B5 B6 B7 B8 B1 B2 B3 B4 B5].

It is noted that the circular shift of 64 samples for each one of preambles 420, 430 and 440 is by way of example only. In alternate embodiments, a circular shift of more than 64 samples or less than 64 samples may be used.

After transmission from Antennas 1, 2, 3 and 4, preambles 410, 420, 430 and 440 are received at a subscriber station. At the receiving subscriber station, it is assumed that the channel response for Antenna 1 is $h_1(t)$, the channel response for Antenna 2 is $h_2(t)$, the channel response for Antenna 3 is $h_3(t)$, and the channel response for Antenna 4 is $h_4(t)$. Thus, the baseband signal, $r(t)$, in the receiving subscriber station may be represented as:

$$r(t) = \{k_1 \cdot p(t)\} \Theta h_1(t) + \{k_2 \cdot p(t-64)_N\} \Theta h_2(t) + \{k_3 \cdot p(t-128)_N\} \Theta h_3(t) + \{k_4 \cdot p(t-192)_N\} \Theta h_4(t) + s_1(t) \Theta h_1(t) + s_2(t) \Theta h_2(t) + s_3(t) \Theta h_3(t) + s_4(t) \Theta h_4(t) + n(t) \quad \text{[Eqn. 1]}$$

In the above equation, $p(t-L)_N$ is the L-sample circularly shifted version of the N-sample long sequence $p(t)$ and $n(t)$ is the white Gaussian noise. In this example, L=64, 128, or 192 and N=512.

In the absence of noise, the channel responses $h_1(t)$, $h_2(t)$, $h_3(t)$, and $h_4(t)$ may be ideally identified by the circular (cross) correlation of $r(t)$ and $p(t)$. Circular cross-correlator 368 receives the baseband signal, $r(t)$, and the original 512 sample PN code, $p(t)$, of the pilot signal and generates the channel responses $h_1(t)$, $h_2(t)$, $h_3(t)$, and $h_4(t)$.

FIG. 6 depicts timing diagram 600, which illustrates the estimation of the channel responses $h_1(t)$, $h_2(t)$, $h_3(t)$, and $h_4(t)$ in the receiving subscriber station according to one embodiment. Because of the circular shifts of preambles 420, 430 and 440 with respect to preamble 410, the receiver in the subscriber station sequentially detects the channel responses $h_1(t)$, $h_2(t)$, $h_3(t)$, and $h_4(t)$. Thus, it is not necessary to include complex cancellation circuitry in the receiver to cancel, for example, the channel response $h_1(t)$ from the channel response $h_2(t)$.

The disclosed apparatus and method employ the circular shift orthogonal property of a pre-designed pseudo-random (PN) code. Each antenna transmits a circularly shifted version of the PN code (embedded in the data symbols), and at the receiver, one cross-correlation operation enables the identification of all channel responses, as long as the product (L×M) of the channel impulse response length, L, and the number of antennas, M, does not exceed the length N of the PN code.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station for communicating with a subscriber station in a wireless network, the base station capable of combining a pilot signal with a data symbol and transmitting the combined pilot signal and data symbol to the subscriber station, the base station comprising:
    an amplifier; and
    a power meter and automatic gain control block configured to measure a power level of the data symbol and generate gain control signals,
    wherein the amplifier is configured to receive the gain control signals and adjust a power level of the pilot signal to be below the power level of the data symbol.

2. The base station as set forth in claim 1, wherein the power level of the pilot signal is at least 12 dB below the power level of the data symbol.

3. The base station as set forth in claim 1, wherein the base station is a single-input, single-output (SISO) system.

4. The base station as set forth in claim 3, wherein the base station is an orthogonal frequency division multiple access (OFDMA) base station.

5. The base station as set forth in claim 3, wherein the base station is a code division multiple access (CDMA) base station.

6. The base station as set forth in claim 1, wherein the base station is a multiple-input, multiple-output (MIMO) system.

7. The base station as set forth in claim 6, wherein the base station is an orthogonal frequency division multiple access (OFDMA) base station.

8. The base station as set forth in claim 6, wherein the base station is a code division multiple access (CDMA) base station.

9. The base station as set forth in claim 6, wherein the base station comprises:
    an antenna array comprising M antennas; and
    a cyclic prefix insertion block for generating pilot signal preambles transmitted from the M antennas,
    wherein the cyclic prefix insertion block generates a first pilot signal preamble by adding a first cyclic prefix to a first pilot signal sequence and generates a second pilot signal preamble by adding a second cyclic prefix to a second pilot signal sequence,
    wherein the second pilot signal sequence is a circularly shifted copy of the first pilot signal sequence, and
    wherein the first pilot signal preamble is combined with a first data symbol and the second pilot signal preamble is combined with a second data symbol.

10. The base station as set forth in claim 9, wherein the combined first pilot signal preamble and first data symbol are transmitted from a first one of the M antennas and the combined second pilot signal preamble and second data symbol are transmitted from a second one of the M antennas, and wherein the combined first pilot signal preamble and first data symbol are transmitted simultaneously with the combined second pilot signal preamble and second data symbol.

11. The base station as set forth in claim 9, wherein the first and second pilot signal preambles are generated from a pseudo-random noise code that is 512 samples in length.

12. A method for transmitting from a base station of a wireless network to a subscriber station, the method comprising the steps of:
    generating a pilot signal;
    measuring a power level of a data symbol;
    generating gain control signals based on the power level of the data symbol;
    based on the gain control signals, adjusting a power level of the pilot signal to be below the power level of the data symbol;
    combining the pilot signal with the data symbol; and
    transmitting the combined pilot signal and data symbol to the subscriber station.

13. The method as set forth in claim 12, wherein the power level of the pilot signal is at least 12 dB below the power level of the data symbol.

14. The method as set forth in claim 12, wherein the base station comprises a multiple-input, multiple-output (MIMO) antenna system.

15. The method as set forth in claim 14, wherein the base station comprises an antenna array comprising M antennas capable of transmitting data to a plurality of subscriber stations, and wherein the steps of generating a pilot signal and combining further comprise the sub-steps of:
    generating a first pilot signal preamble by adding a first cyclic prefix to a first pilot signal sequence;
    combining the first pilot signal preamble with a first data symbol;
    generating a second pilot signal preamble by adding a second cyclic prefix to a second pilot signal sequence, wherein the second pilot signal sequence is a circularly shifted copy of the first pilot signal sequence; and
    combining the second pilot signal preamble with a second data symbol.

16. The method as set forth in claim 15, wherein the step of transmitting further comprises the sub-steps of:
    transmitting the combined first pilot signal preamble and first data symbol from a first one of the M antennas; and
    transmitting the combined second pilot signal preamble and second data symbol from a second one of the M antennas simultaneously with the step of transmitting the combined first pilot signal preamble and first data symbol from the first antenna.

17. The method as set forth in claim 15, wherein the first and second pilot signal preambles are generated from a pseudo-random noise code that is 512 samples in length.

18. A system for wireless communications, the system comprising:
    at least one base station for communicating with a subscriber station in a wireless network, and capable of combining a pilot signal with a data symbol and transmitting the combined pilot signal and data symbol to the subscriber station, each of the at least one base station comprising:
    an amplifier; and
    a power meter and automatic gain control block configured to measure a power level of the data symbol and generate gain control signals,
    wherein the amplifier is configured to receive the gain control signals and adjust a power level of the pilot signal to be below the power level of the data symbol.

19. The system of claim 18, wherein the at least one base station is one of an orthogonal frequency division multiple access (OFDMA) base station and a code division multiple access (CDMA) base station.

20. The system of as set forth in claim 18, wherein each of the at least one base station further comprises:

an antenna array comprising M antennas; and
a cyclic prefix insertion block for generating pilot signal preambles transmitted from the M antennas,
wherein the cyclic prefix insertion block generates a first pilot signal preamble by adding a first cyclic prefix to a first pilot signal sequence and generates a second pilot signal preamble by adding a second cyclic prefix to a second pilot signal sequence, and
wherein the second pilot signal sequence is a circularly shifted copy of the first pilot signal sequence.

* * * * *